US006937928B2

(12) United States Patent
Capito

(10) Patent No.: US 6,937,928 B2
(45) Date of Patent: Aug. 30, 2005

(54) STABILITY CONTROL SYSTEM HAVING LOADING INFORMATION

(75) Inventor: Russell T. Capito, Clarkston, MI (US)

(73) Assignee: Continental Teves, Inc., Auburn Hills, MI (US)

(*) Notice: Subject to any disclaimer, the term of this patent is extended or adjusted under 35 U.S.C. 154(b) by 199 days.

(21) Appl. No.: 10/378,853

(22) Filed: Mar. 4, 2003

(65) Prior Publication Data
US 2004/0176889 A1 Sep. 9, 2004

(51) Int. Cl.[7] ............................................. G06F 7/00
(52) U.S. Cl. ......................... 701/37; 701/38; 280/5.5
(58) Field of Search ..................... 701/37, 38; 280/5.5, 280/5.502, 5.506, 5.507, 5.513

(56) References Cited

U.S. PATENT DOCUMENTS

| 5,113,345 | A | * | 5/1992 | Mine et al. ............... 701/38 |
| 6,351,694 | B1 | * | 2/2002 | Tseng et al. ............... 701/1 |
| 2001/0008986 | A1 | | 7/2001 | Brown et al. ............... 701/1 |

* cited by examiner

Primary Examiner—Yonel Beaulieu

(57) ABSTRACT

A stability control system includes a sensor for measuring the position of the suspension system. Alternatively, the sensor may directly detect the load on the suspension system. With this information, the system calculates a vehicle loading condition. A yaw rate model is selected based on the calculated vehicle loading condition. Preferably, a number of loading condition values are stored and a controller selects the best fitting loading condition value to serve as the yaw rate model.

25 Claims, 2 Drawing Sheets

STABILITY CONTROL SYSTEM HAVING LOADING INFORMATION

FIELD OF THE INVENTION

The present invention relates generally to stability control systems for automotive vehicles, and more particularly relates to the use of vehicle loading information by a stability control system.

BACKGROUND OF THE INVENTION

Stability control systems for automotive vehicles have recently begun to be offered on various products. Stability control systems typically monitor the dynamic behavior of the vehicle to prevent or control unstable driving characteristics. For example, yaw control systems typically control the yaw of the vehicle by regulating the braking effort at the various wheels of the vehicle. Similarly, roll control systems typically control the roll or tilt of the vehicle by regulating the braking effort at the various wheels, typically the outside wheels in a turn.

Typically, the stability control system utilizes a sensor cluster including at least a lateral acceleration sensor, a longitudinal acceleration sensor, a speed sensor, and a steering angle sensor. The sensor cluster may also include a yaw rate sensor, a roll rate sensor, and a pitch rate sensor. Based on information from the sensor cluster, the stability control system will determine the potential for unstable conditions and apply a corrective action, typically through braking of the wheels or by modifying the tire steering direction. A model is created for each particular vehicle so that the stability control system can recognize when the information obtained from the sensors indicates a propensity for vehicle instability. That is, since the dynamics of a vehicle are individual to that vehicle, different critical values are used to determine vehicle instability.

Unfortunately, the vehicle reference model, such as a yaw rate reference model, does not always accurately represent the vehicle for every loading condition. That is, when the vehicle is in a loaded condition, the yaw rate reference model may be inaccurate. Thus, during certain driving maneuvers, the control strategy that is beneficial for an unloaded vehicle is not necessarily appropriate for a loaded vehicle. Accordingly, there exists a need to provide a stability control system that accurately represents the vehicle for all loading conditions.

BRIEF SUMMARY OF THE INVENTION

The present invention provides a stability control system and method for accurately representing the vehicle for all loading conditions. The stability control system includes a sensor for measuring the position of the suspension system. With this information, a vehicle loading condition can be calculated. Alternatively, the sensor may directly detect the suspension load and hence vehicle loading condition. Then, a yaw rate model is selected based on the calculated or sensed vehicle loading condition. Preferably, a number of loading condition values are stored and a controller selects the best fitting loading condition value to serve as the yaw rate model. Most preferably, the controller will interpolate between stored loading condition values in order to select the best fitting loading condition and yaw rate model.

Additionally, information from the suspension travel/load sensor can be used to replace and/or correct a number of sensor signals in the sensor cluster of the stability control system. More specifically, a roll angle and rate can be determined from the suspension sensor. Further, both lateral acceleration and longitudinal acceleration can be calculated based on information from the suspension sensor. Accordingly, it is possible to replace the roll rate sensor, lateral acceleration sensor and longitudinal acceleration sensor, although the information from the suspension sensor may be utilized to supplement and correct values received from these existing sensors.

Furthermore, certain stability control strategies may be employed based on the suspension sensor. For example, the suspension sensor can be used to detect a banked condition, which in turn can be used to prevent false activation of stability control arising from incorrect lateral acceleration values. Thus, this strategy relates to the replacement and/or correction of the lateral acceleration sensor. The suspension sensor may also be used to detect bumps over the road surface, which can be used to alter traction control. Finally, the information from the suspension sensor can be utilized to estimate a surface coefficient of friction, which can also be utilized by the traction control system and stability control system.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
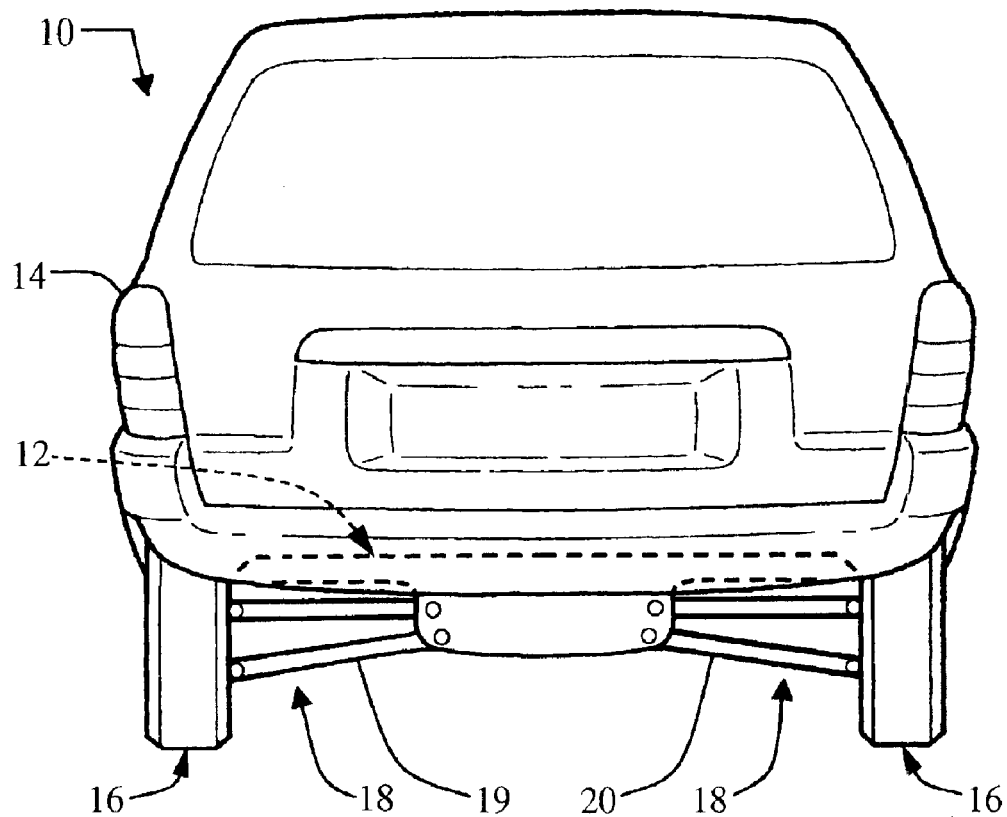
FIG. 1 is a schematic of a suspension system for a vehicle.

Turning now to the figures, FIG. 1 schematically depicts a vehicle 10 which can employ the stability control system and method of the present invention. The vehicle 10 includes a vehicle frame 12 which is connected to a vehicle body 14. The frame 12 is also connected to the wheels 16 of the vehicle 10. As is known in the art, a suspension system 18 is utilized to link the wheels 16 to the vehicle frame 12. The suspension system 18 includes a plurality of linkages such as those denoted by numerals 19 and 20, for individual connection of each wheel 16 to the vehicle frame 12. The suspension system 18 may include active damping shock absorbers, or may simply be air spring systems.

As will be readily understood by those having skill in the art, a position sensor such as a displacement transducer can be utilized by the suspension system 18, preferably at each of the linkages such as 19, 20, in order to provide suspension position signals. Alternatively, a load sensor could be employed at each of the linkages to provide suspension load signals, or information from an active suspension system may be used to identify suspension load.

The suspension position signals would be reflective of the position of each wheel 16 relative to the vehicle frame 12. The suspension position sensors could also be used to detect the load on the system 18 and its individual linkages 19, 20. That is, a signal indicative of the suspension loading could be calculated using the suspension position sensor and a known spring rate of the individual linkages. It will be recognized that numerous different types of sensors or transducers may be employed to measure the suspension travel and the suspension loading, which in turn can be used as input signals for a stability control system.

Figure 2:
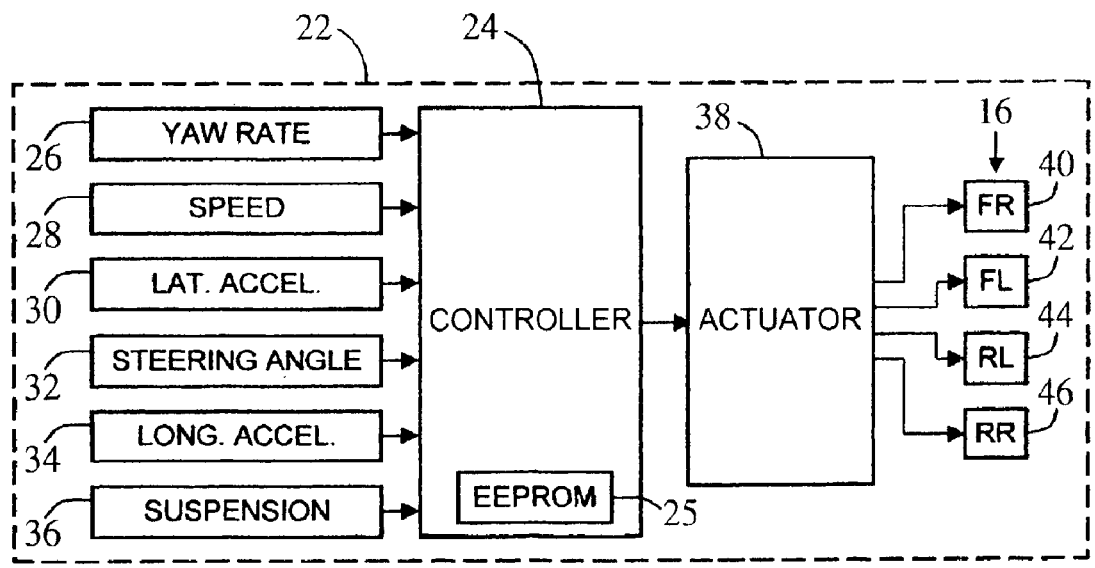
FIG. 2 is a logic flow chart for an embodiment of a stability control system constructed in accordance with the teachings of the present invention.

Turning now to FIG. 2, a stability control system 22 is schematically depicted. The stability control system 22 includes a controller 24 for receiving inputs from various sensors and the sensor cluster. As depicted, the sensor cluster may be include a yaw rate sensor 26, a speed sensor 28, a lateral acceleration sensor 30, a steering angle sensor 32, a longitudinal acceleration sensor 34, and a suspension sensor 36. The suspension sensor 36 is of the type as previously discussed which will provide an input representing at least the position of the suspension system 18, and preferably the load on the suspension. The controller 24 includes a memory area 25, and employs a control logic to stabilize the vehicle 10 in the event the sensors indicate the potential for an unstable condition. Generally, the controller 24 sends an input control signal to an actuator 38 for providing corrective action. For example, the actuator 38 may be a brake control system which can actively brake the wheels 16 of the vehicle, shown as front right wheel 40, front left wheel 42, rear left wheel 44, and rear right wheel 46.

By monitoring the position of the suspension system 18 via the suspension sensor 36, the stability control system 22 and its method 50 (FIG. 3) can achieve several improvements. First, a better stability control model such as a yaw rate model may be loaded which best represents the actual condition and handling characteristics of the vehicle. Second, numerous sensors may be corrected, and may even be replaced. Third, numerous stability control strategies may be employed based on a suspension signal. With regard to the first improvement, a best fitting vehicle stability control reference model can be selected based on the specific loaded or unloaded condition of the vehicle. The stability control model will be described herein as a yaw rate model, although other dynamic models may also be employed. For example, various percentages of the gross vehicle weight loading may be utilized in this determination. Stored values of vehicle loading conditions may be utilized in selecting the best fitting yaw rate model. The yaw rate model may also be selected by interpolating between stored loading conditions. Preferably, the best fitting yaw rate model is selected upon vehicle ignition, although the selection may be made after vehicle ignition but just as or before the vehicle is placed into gear for travel.

With regard to the correction and replacement of various sensor signals, the suspension sensor 36 can be utilized in many areas. For example, the roll angle of the vehicle can be calculated based on the position and/or loading of the suspension system 18, and this information can also be utilized to calculate a roll rate of the vehicle. As a simple example, the roll angle can be calculated based on the position of the suspension system 18 and the linkages 19 on the left wheels 16, relative to the linkages 20 on the right wheels 16. Accordingly, other existing roll rate or angle sensors may be replaced by the suspension sensor 36.

Additionally, both lateral acceleration and longitudinal acceleration can be calculated based on the suspension sensor 36. Using the roll angle information (which can be obtained from the suspension sensor 36 as discussed above), a lateral acceleration can be calculated utilizing the vehicle speed sensor 28 and the steering angle sensor 32. Alternatively, the signal from the lateral acceleration sensor 30 may simply be corrected based on the information from the suspension sensor 36. With regard to longitudinal acceleration, the transfer of load between the front and rear of the vehicle can be calculated based on the position or load of the suspension system 18 as detected by the sensor 36.

Thus, the position of the linkages on the front wheels relative to the rear wheels indicate load transfer, and in combination with wheel deceleration as measured by speed sensor 28 or individual wheel speed sensors, the longitudinal acceleration can be calculated based on the load transfer relative to the wheel deceleration or acceleration. That is, a given vehicle acceleration or deceleration and load transfer of the vehicle 10 will correspond with a certain longitudinal acceleration or deceleration.

And as previously noted, the stability control system 22 and its method 50 may employ special stability control strategies based on the information from the suspension sensor 36. For example, a banked condition can be detected and a bank angle can be calculated. When the vehicle 10 is driven on a banked road, a component of the vehicle's lateral acceleration will be absorbed by the suspension 18. This will result in a certain increase in suspension travel and suspension load as measured by the sensor 36. From this, the vehicle's bank angle can be calculated. The bank angle can also be used to prevent false activation of the stability control system from incorrect lateral acceleration readings.

Similarly, the suspension sensor 36 can detect a bump in the surface over which the vehicle 10 is traveling. Thus, traction control systems may be altered based on this information and unwanted activation may be prevented. Finally, the surface co-efficient of friction may be estimated from the suspension sensor information 36. Since the normal load on a wheel 16 can be calculated, the vector sum of the lateral and longitudinal acceleration values, divided by a vertical acceleration (which is a result of the normal load) on the wheel, gives a coefficient of friction valve. In turn, this valve can also be utilized by the traction control system and stability control system.

Figure 3:
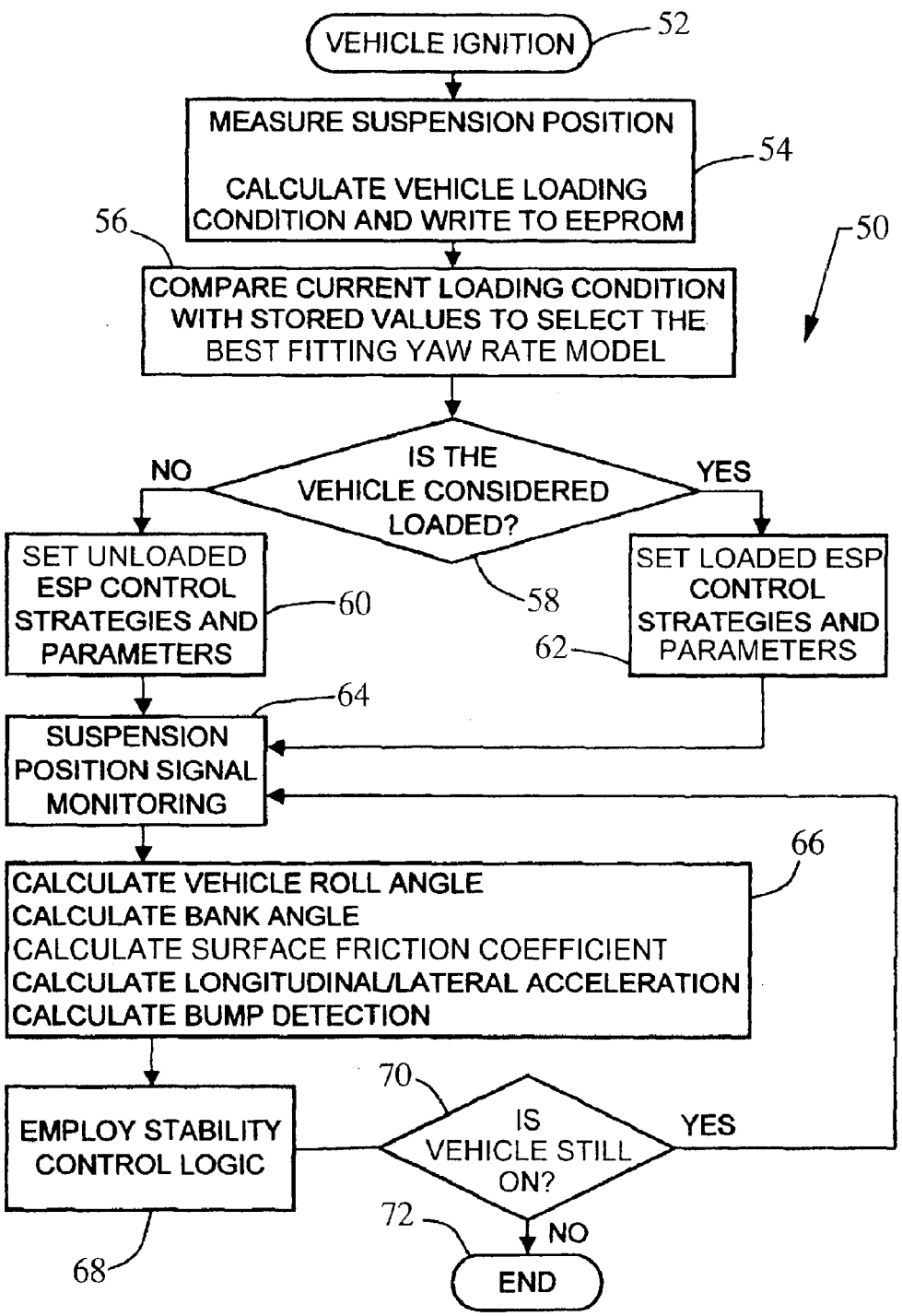

Turning now to FIG. 3, the control logic 50 for the stability control system 22 is shown in a flow chart. At block 52, the vehicle is turned on via the ignition, staring the control system 22. Next, the position of the suspension is measured by the suspension sensor 36, as indicated by block 54. Further, the controller 24 calculates a vehicle loading condition based on the position of the suspension system 18. The vehicle loading condition is written to non-volatile memory or EEPROM 25. As indicated by block 56, the controller 24 then compares the current loading condition to stored loading condition values and selects the best fitting yaw rate model for the vehicle. Preferably, the step of comparing the current loading condition to stored values and selecting the best fitting yaw rate model includes interpolation between two stored values of loading conditions to define the best fitting yaw rate model.

Once the best fitting yaw rate model has been selected, the controller 24 decides whether the vehicle is considered loaded as indicated by block 58. If the vehicle is not loaded, the method 50 sets unloaded stability control strategies and parameters as indicated by block 60. If the vehicle is considered loaded, the method 50 sets loaded stability control strategies and parameters as indicated by block 62. In either event, the method 50 flows to block 64 where monitoring of suspension position via suspension sensor 36 continues in order to employ these strategies and parameters. As indicated by block 66, the controller 24, based on the set control strategies and parameters, can calculate the vehicle roll angle, the bank angle, the surface friction co-efficient, longitudinal acceleration, lateral acceleration, and bump detection. Based on the calculations of block 66, as well as the input from the sensors of the sensor cluster, the controller 24 will employ its stability control logic as indicated by block 68. Thus, the stability control system 22 and method 50 will control the actuator 38 as necessary to maintain vehicle stability. Finally, the method 50 decides whether the vehicle is still on as indicated by block 70. When the vehicle is still on, the method flows back to block 64 and continues monitoring the suspension position signal. If the vehicle has been turned off, the method flows through its end as indicated by block 72.

Accordingly, by monitoring the position and travel of the suspension system 18, as well as the load on the suspension system 18, a best fitting yaw rate model may be selected to represent the vehicle 10 loading condition, many sensors in the sensor cluster may be replaced or alternately their values may be corrected, and several unique stability control strategies may be employed. These features result in an improvement in the stability of the vehicle by providing a more accurate model of the vehicle, by providing more accurate information regarding the dynamic forces on the vehicle, and employing certain strategies that overcome deficiencies of prior systems.

The foregoing description of various embodiments of the invention has been presented for purposes of Illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for providing stability control in an automotive vehicle having wheels connected to the vehicle via a suspension system, the method comprising the steps of:
   sensing the position of the suspension system of the vehicle;
   calculating a vehicle loading condition based on the sensed position of the suspension system; and
   selecting a stability control model for the vehicle by comparing the calculated vehicle loading condition with stored values of loading conditions and selecting the best fitting stability control model.

2. The method of claim 1, further comprising the step of calculating a vehicle roll angle based on the vehicle loading condition.

3. The method of claim 1, further comprising the step of calculating a vehicle roll rate based on the vehicle loading condition.

4. The method of claim 1, further comprising the step of calculating a longitudinal acceleration of the vehicle based on the vehicle loading condition.

5. The method of claim 4, wherein the step of calculating a longitudinal acceleration is based on the change in position of the suspension for the front wheels relative to the suspension for the rear wheels.

6. The method of claim 1, further comprising the step of calculating a lateral acceleration of the vehicle based on the vehicle loading condition.

7. The method of claim 6, wherein the step of calculating a longitudinal acceleration is based on the change in position of the suspension for the left wheels relative to the suspension for the rear wheels.

8. The method of claim 1, further comprising the step of calculating a vehicle bank angle based on the vehicle loading condition.

9. The method of claim 8, further comprising the step of correcting a lateral acceleration based on the vehicle bank angle.

10. The method of claim 1, further comprising the stop of detecting a bump in the surface over which the vehicle is traveling based on the vehicle loading condition.

11. The method of claim 10, further comprising the step of preventing engagement of electronic stability control when a bump is detected.

12. The method of claim 1, further comprising the step of calculating a surface friction coefficient based on the vehicle loading condition.

13. The method of claim 12, wherein the step of sensing the position of the suspension system includes determining a vertical acceleration of the wheels.

14. The method of claim 13, wherein the step of calculating the surface friction coefficient is based on lateral and longitudinal acceleration values of the vehicle relative to the vertical acceleration of the wheels.

15. The method of claim 1, wherein the step of selecting a stability control model includes the step of writing the vehicle loading condition to a non-volatile memory storage area.

16. The method of claim 1, wherein the step of selecting the best fitting stability control model includes interpolating between two stored values of loading conditions to define the best fitting stability control model.

17. The method of claim 1, wherein the step of selecting a stability control model occurs after the vehicle ignition has been turned on but before the vehicle begins travel.

18. A stability control system for an automotive vehicle having wheels connected to the vehicle via a suspension system, the stability control system comprising:
    a suspension sensor for monitoring the suspension system of the vehicle and sending a loading condition signal;
    a controller or receiving the loading condition signal; and
    the controller comparing the loading condition signal to stored loading condition values and selecting the best fitting loading condition values to serve as the stability control model for the vehicles.

19. The stability control system of claim 18, wherein the suspension sensor includes an individual sensor for each wheel.

20. The stability control system of claim 18, wherein the suspension sensor is a position sensor.

21. The stability control system of claim 20, wherein the suspension sensor measures the position of the front wheals relative to the rear wheels.

22. The stability control system of claim 20, wherein the suspension travel sensor measures the position of the right wheels relative to the left wheels.

23. The stability control system of claim 18, wherein the controller selects the best fitting loading condition value by interpolating between stored loading condition values.

24. The stability control system of claim 18, further comprising a non-volatile memory for starting the selected stability control model.

25. The stability control system of claim 18, wherein the suspension sensor is integrally formed with the suspension system as an active suspension system.

* * * * *